US012801482B2

(12) United States Patent
Terpstra et al.

(10) Patent No.: US 12,801,482 B2
(45) Date of Patent: Nov. 17, 2026

(54) VARIABLE DEPTH PIPELINE FOR ERROR CORRECTION

(71) Applicant: SiFive, Inc., San Mateo, CA (US)

(72) Inventors: Wesley Waylon Terpstra, San Mateo, CA (US); Eric Andrew Gouldey, Fort Collins, CO (US)

(73) Assignee: SiFive, Inc., Santa Clara, CA (US)

( * ) Notice: Subject to any disclaimer, the term of this patent is extended or adjusted under 35 U.S.C. 154(b) by 242 days.

(21) Appl. No.: 18/527,215

(22) Filed: Dec. 1, 2023

(65) Prior Publication Data

US 2024/0184663 A1 Jun. 6, 2024

Related U.S. Application Data

(60) Provisional application No. 63/429,978, filed on Dec. 2, 2022.

(51) Int. Cl.
*G06F 11/00* (2006.01)
*G06F 11/07* (2006.01)

(52) U.S. Cl.
CPC ...... *G06F 11/0793* (2013.01); *G06F 11/0772* (2013.01); *G06F 11/0784* (2013.01)

(58) Field of Classification Search
CPC ............. G06F 11/1064; G06F 11/1048; G06F 11/0784; G06F 11/0793; G06F 11/0772; G06F 11/0751; G06F 11/0721
See application file for complete search history.

(56) References Cited

U.S. PATENT DOCUMENTS 8,862,935 B2 * 10/2014 Das ..................... G06F 11/1076 714/10
9,658,919 B2 * 5/2017 Pathirane ............ G06F 11/0751
2005/0125695 A1 * 6/2005 Gilbert ................ G06F 11/0724 714/E11.131
2006/0294344 A1 * 12/2006 Hsu ..................... G06F 9/30123 712/228
2008/0250271 A1 * 10/2008 Ozer ................... G06F 11/0793 712/E9.05
2013/0166952 A1 * 6/2013 Schon ................... G06F 9/3861 714/E11.138

* cited by examiner

*Primary Examiner* — Charles Ehne
(74) *Attorney, Agent, or Firm* — Kilpatrick Townsend & Stockton LLP

(57) ABSTRACT

Systems and methods are disclosed for variable depth pipelines for error correction. For example, some methods may include changing the depth of a pipeline in response to an error signal from a stage of the pipeline. Changing the depth of the pipeline may include routing signals from the stage of the pipeline that resulted in the error signal through an error correction stage of the pipeline to a next stage of the pipeline that previously received output signals from the stage of the pipeline that resulted in the error signal. The methods may include continuing to route signals through the error correction stage of the pipeline to the next stage of the pipeline for multiple clock cycles until a pipeline bubble event is detected.

17 Claims, 11 Drawing Sheets

VARIABLE DEPTH PIPELINE FOR ERROR CORRECTION

CROSS-REFERENCE TO RELATED APPLICATION

This application claims priority to and the benefit of U.S. Provisional Patent Application Ser. No. 63/429,978, filed Dec. 2, 2022, the entire disclosure of which is hereby incorporated by reference.

TECHNICAL FIELD

This disclosure relates to variable depth pipelines for error correction.

BACKGROUND

A central processing unit (CPU) or processor core may be implemented according to a particular microarchitecture. As used herein, a "microarchitecture" refers to the way an instruction set architecture (ISA) (e.g., the RISC-V instruction set) is implemented by a processor core. A microarchitecture may be implemented by various components, such as dispatch units, execution units, registers, caches, queues, data paths, and/or other logic associated with instruction flow. A processor core may execute instructions in a pipeline based on the microarchitecture that is implemented.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
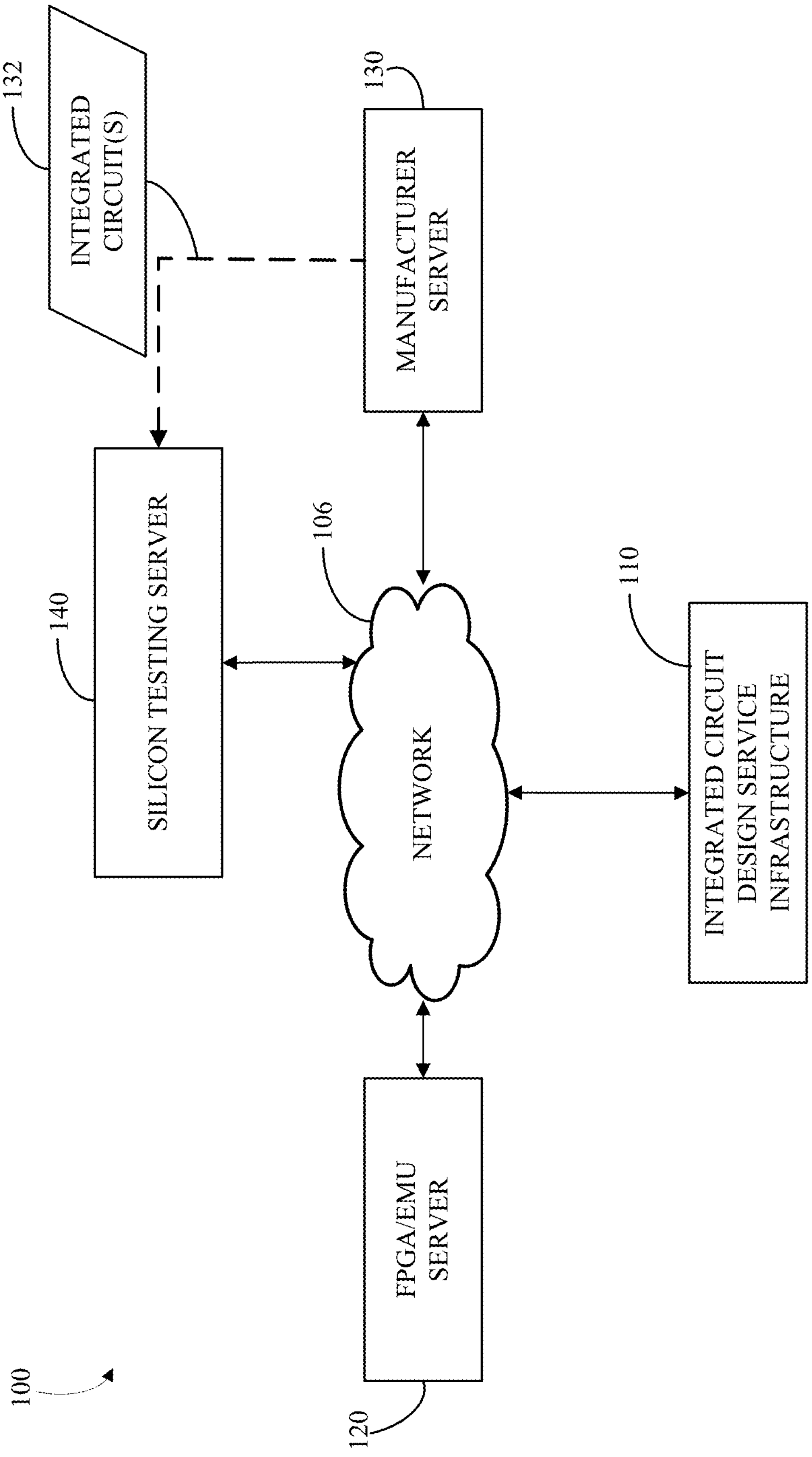
FIG. 1 is a block diagram of an example of a system for facilitating generation and manufacture of integrated circuits.

An Instruction Set Architecture (ISA) (such as the RISC-V ISA) may implement instructions such as scalar and vector instructions. A processor may execute the instructions using a pipeline which may have multiple pipeline stages. Each pipeline stage may process the instruction. In processing the instruction, a pipeline stage may generate a speculatively correct data signal, a problem detected or error signal when a problem or error is detected in the data signal, and a correction signal or corrective action to correct the data signal. In some cases, the corrective action responsive to the error signal can be applied in a fixed number of cycles. In this circumstance, recovery from an error event occurring in the pipeline may be implemented in a variety of ways.

The stall method is one method for recovering from an error event. In the stall method, the problem detected signal is used to discard the value in the next pipeline stage and also disable the update to all prior pipeline stages. This is a problem in high frequency designs because the problem detected signal is often the result of many gates of delay. That is, the problem detected signal may need to be sent to many registers. In some instances, the registers may be distributed far away. For these reasons, integrated circuit designers may use a replay option as described below. However, the stall method keeps the items in the pipeline in order, which is often an important property.

The replay method is another method where the problem detected signal is used to discard the value in the next stage and also feed the corrected value back into the front of the pipeline. Variations of this method can incur very little impact on frequency. However, by taking a problem value out of the pipeline and reinserting it at the front of the pipeline disrupts the pipeline order.

Disclosed herein are implementations of variable depth pipelines for error correction. In some implementations described herein a pipeline is dynamically reconfigured to temporarily enter an extended pipeline mode. When a problem is detected, the value going to the next pipeline stage may be discarded. However, a corrected value may be sent to an intermediate or extended (collectively "extended") pipeline stage. Thereafter, this optional-but-now-in-use extended pipeline stage continues to accept the corrected value as input and supplies it to the next pipeline stage. This keeps the values exiting the pipeline in order. Furthermore, the problem detected signal only kills the next value and thus, can run at high frequency in contrast to the stall method. Eventually, there will be a pipeline bubble, at which point a sticky register holding or maintaining the pipeline in the extended pipeline mode can be cleared.

As used herein, the term "circuitry" refers to an arrangement of electronic components (e.g., transistors, resistors, capacitors, and/or inductors) that is structured to implement one or more functions. For example, a circuitry may include one or more transistors interconnected to form logic gates that collectively implement a logical function.

FIG. 1 is a block diagram of an example of a system 100 for generation and manufacture of integrated circuits. The system 100 includes a network 106, an integrated circuit design service infrastructure 110, a field programmable gate array (FPGA)/emulator server 120, and a manufacturer server 130. For example, a user may utilize a web client or a scripting API client to command the integrated circuit design service infrastructure 110 to automatically generate an integrated circuit design based a set of design parameter values selected by the user for one or more template integrated circuit designs. In some implementations, the integrated circuit design service infrastructure 110 may be configured to generate an integrated circuit design that includes the circuitry shown and described in FIGS. 3-8.

The integrated circuit design service infrastructure 110 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high-level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 110 may invoke (e.g., via network communications over the network 106) testing of the resulting design that is performed by the FPGA/emulation server 120 that is running one or more FPGAs or other types of hardware or software emulators. For example, the integrated circuit design service infrastructure 110 may invoke a test using a field programmable gate array, programmed based on a field programmable gate array emulation data structure, to obtain an emulation result. The field programmable gate array may be operating on the FPGA/emulation server 120, which may be a cloud server. Test results may be returned by the FPGA/emulation server 120 to the integrated circuit design service infrastructure 110 and relayed in a useful format to the user (e.g., via a web client or a scripting API client).

The integrated circuit design service infrastructure 110 may also facilitate the manufacture of integrated circuits using the integrated circuit design in a manufacturing facility associated with the manufacturer server 130. In some implementations, a physical design specification (e.g., a graphic data system (GDS) file, such as a GDS II file) based on a physical design data structure for the integrated circuit is transmitted to the manufacturer server 130 to invoke manufacturing of the integrated circuit (e.g., using manufacturing equipment of the associated manufacturer). For example, the manufacturer server 130 may host a foundry tape out website that is configured to receive physical design specifications (e.g., as a GDSII file or an OASIS file) to schedule or otherwise facilitate fabrication of integrated circuits. In some implementations, the integrated circuit design service infrastructure 110 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 110 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 130 may fabricate and/or test integrated circuits based on the integrated circuit design. For example, the associated manufacturer (e.g., a foundry) may perform optical proximity correction (OPC) and similar post-tapeout/pre-production processing, fabricate the integrated circuit(s) 132, update the integrated circuit design service infrastructure 110 (e.g., via communications with a controller or a web application server) periodically or asynchronously on the status of the manufacturing process, perform appropriate testing (e.g., wafer testing), and send to packaging house for packaging. A packaging house may receive the finished wafers or dice from the manufacturer and test materials and update the integrated circuit design service infrastructure 110 on the status of the packaging and delivery process periodically or asynchronously. In some implementations, status updates may be relayed to the user when the user checks in using the web interface and/or the controller might email the user that updates are available.

In some implementations, the resulting integrated circuits 132 (e.g., physical chips) are delivered (e.g., via mail) to a silicon testing service provider associated with a silicon testing server 140. In some implementations, the resulting integrated circuits 132 (e.g., physical chips) are installed in a system controlled by silicon testing server 140 (e.g., a cloud server) making them quickly accessible to be run and tested remotely using network communications to control the operation of the integrated circuits 132. For example, a login to the silicon testing server 140 controlling a manufactured integrated circuits 132 may be sent to the integrated circuit design service infrastructure 110 and relayed to a user (e.g., via a web client). For example, the integrated circuit design service infrastructure 110 may control testing of one or more integrated circuits 132, which may be structured based on an RTL data structure.

Figure 2:
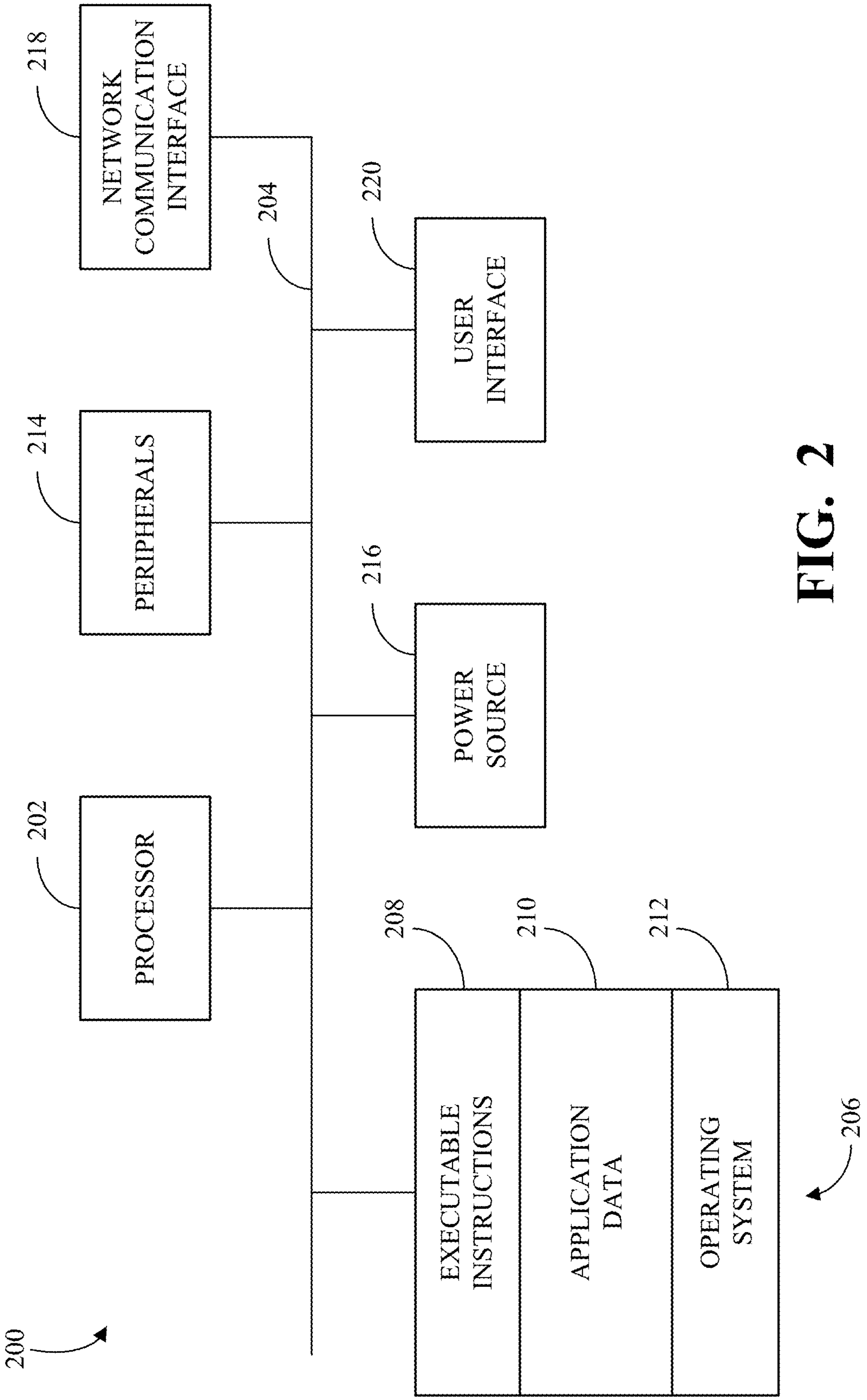
FIG. 2 is a block diagram of an example of a system for facilitating generation of integrated circuits.

FIG. 2 is a block diagram of an example of a system 200 for facilitating generation of integrated circuits, for facilitating generation of a circuit representation for an integrated circuit, and/or for programming or manufacturing an integrated circuit. The system 200 is an example of an internal configuration of a computing device. The system 200 may be used to implement the integrated circuit design service infrastructure 110, and/or to generate a file that generates a circuit representation of an integrated circuit design including the circuitry shown and described in FIGS. 3-8. The system 200 can include components or units, such as a processor 202, a bus 204, a memory 206, peripherals 214, a power source 216, a network communication interface 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information.

For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more DRAM modules such as double data rate (DDR) synchronous dynamic random access memory (SDRAM), and non-volatile memory, such as a disk drive, a solid state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a system 200 can include volatile memory, such as RAM, and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions executable by the processor 202 to cause the system 200 to automatically, in response to a command, generate an integrated circuit design and associated test results based on a design parameters data structure. The application data 210 can include, for example, user files, database catalogs or dictionaries, configuration information or functional programs, such as a web browser, a web server, a database server, or a combination thereof. The operating system 212 can be, for example, Microsoft Windows®, macOS®, or Linux®; an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals 214 can be sensors or detectors, or devices containing any number of sensors or detectors, which can monitor the system 200 itself or the environment around the system 200. For example, a system 200 can contain a temperature sensor for measuring temperatures of components of the system 200, such as the processor 202. Other sensors or detectors can be used with the system 200, as can be contemplated. In some implementations, the power source 216 can be a battery, and the system 200 can operate independently of an external power distribution system. Any of the components of the system 200, such as the peripherals 214 or the power source 216, can communicate with the processor 202 via the bus 204.

The network communication interface 218 can also be coupled to the processor 202 via the bus 204. In some implementations, the network communication interface 218 can comprise one or more transceivers. The network communication interface 218 can, for example, provide a connection or link to a network, such as the network 106 shown in FIG. 1, via a network interface, which can be a wired network interface, such as Ethernet, or a wireless network interface. For example, the system 200 can communicate with other devices via the network communication interface 218 and the network interface using one or more network protocols, such as Ethernet, transmission control protocol (TCP), Internet protocol (IP), power line communication (PLC), wireless fidelity (Wi-Fi), infrared, general packet radio service (GPRS), global system for mobile communications (GSM), code division multiple access (CDMA), or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the system 200 can be provided in addition to or as an alternative to a display. In some implementations, the user interface 220 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 804 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 3:
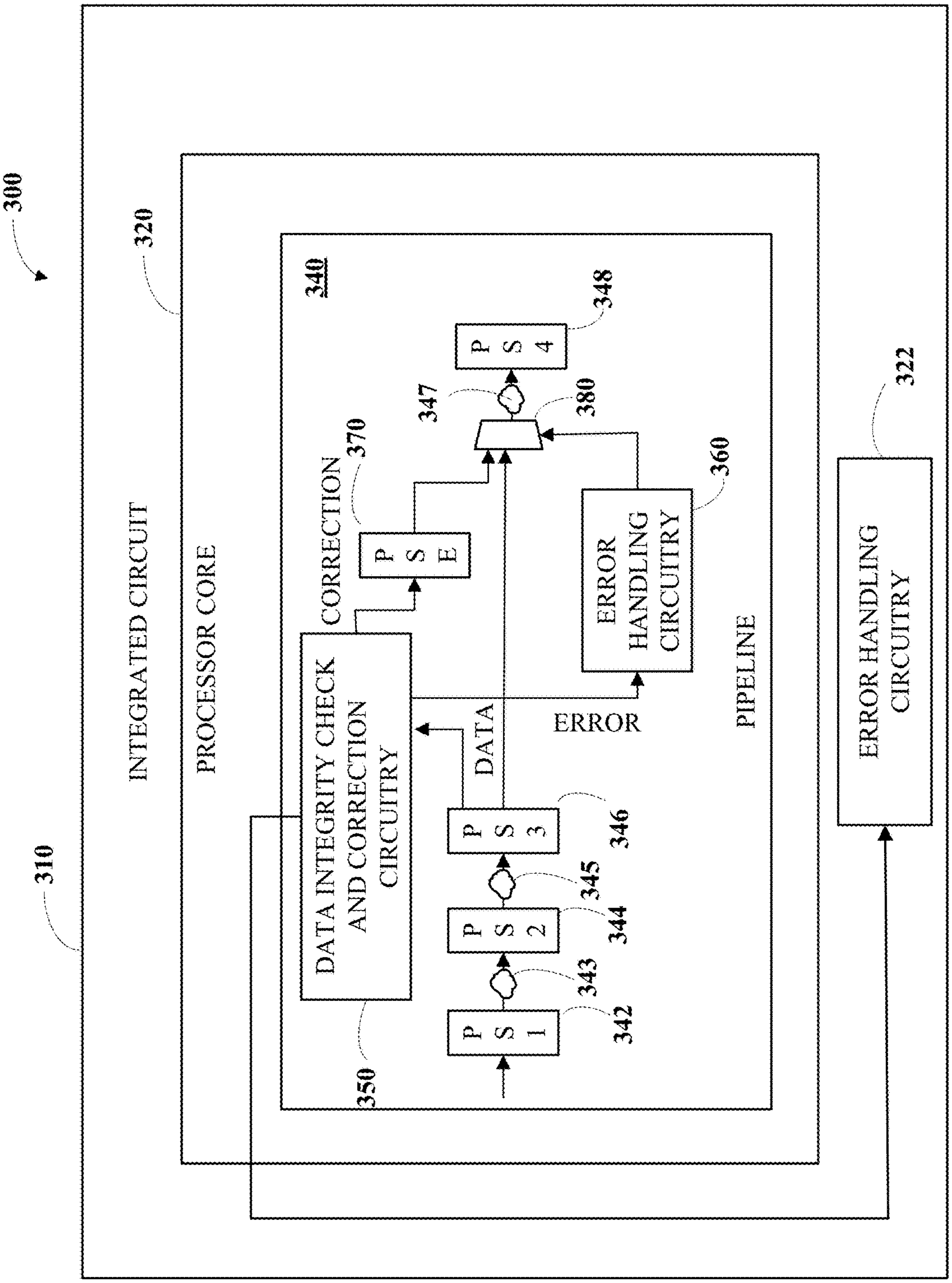
FIG. 3 is a block diagram of an example of an integrated circuit for variable depth pipelines for error correction. This example is employed in a pipeline of a processor core.

FIG. 3 is a block diagram of an example of a system 300 including an integrated circuit 310 that implements variable depth pipelines for error correction when processing or executing instructions, data, addresses, and the like (input signal). The integrated circuit 310 can include one or more systems, circuits, and/or components which can implement a variable depth pipeline for error correction. In some implementations, the integrated circuit 310 includes at least one processor core 320 and can be implemented, for example, as a field-programmable gate array (FPGA), an application-specific integrated circuit (ASIC), or a system-on-chip (SoC). The processor core 320 includes circuitry for executing or processing, for example, instructions, addresses, and/or data (collectively "input signals") and can include one or more pipelines, such as pipeline 340. The processor core 320 fetches and executes the input signals in the one or more pipelines, for example, as part of a program sequence. The input signals may cause memory requests (e.g., write requests and read requests) that the one or more pipelines transmit to a cache memory to write or read data stored in the cache memory.

Each of the one or more pipelines, such as the pipeline 340, can include multiple pipeline stages and logic clouds (where a cloud may represent circuitry) which can process the input signal. For example, the pipeline 340 can include a pipeline stage (PS) 1 342, a logic cloud 343, a PS 2 344, a logic cloud 345, a PS 3 346, a logic cloud 347, and a PS 4 348. The number of pipeline stages and logic clouds are illustrative and the pipeline 340 can have any number of appropriate and applicable pipeline stages and logic clouds.

The pipeline 340 and/or the PS 1 342, the logic cloud 343, the PS 2 344, the logic cloud 345, the PS 3 346, the logic cloud 347, and the PS 4 348 can include a data integrity check and correction circuitry 350, an error handling circuitry 360, and an optionally-enabled PS extension or intermediate PS (collective PS E) 370. Multiple pipeline stages can be connected via a multiplexor switch circuit 380. The data integrity check and correction circuitry 350, the error handling circuitry 360, the PS E 370, and the multiplexor switch circuit 380 are shown, for purposes of illustration, with respect to PS 3 346 and PS 4 348. Implementation of the data integrity check and correction circuitry 350, the error handling circuitry 360, the PS E 370, and the multiplexor switch circuit 380 for the pipeline 340 and/or the pipeline 340 and/or the PS 1 342, the logic cloud 343, the PS 2 344, the logic cloud 345, the PS 3 346, the logic cloud 347, and the PS 4 348 can vary without departing from the scope of the specification or claims.

The data integrity check and correction circuitry 350 can check for a problem, issue, or error (collectively "error") with respect to a presumably correct output signal that is exiting the pipeline 340 and/or at a pipeline stage(s). The data integrity check and correction circuitry 350 can verify value, data type, value range, and/or other criteria. In the instance that there is no error in the presumably correct output signal, the presumably correct output signal is processed as is through the pipeline 340. The data integrity check and correction circuitry 350 can generate, issue, or transmit ("generate") an error signal when an issue or problem is detected with the output signal to the error handling circuitry 360 and can generate and transmit a correction or corrected output signal to the PS E 370. In the instance that the error in the presumably correct output signal cannot be corrected, the presumably correct output signal is processed as is through the pipeline 340 and an error report signal is sent to an external circuit such as error handling circuitry 322 for other error handling processing.

Detection of an error and subsequent actions, places the integrated circuit 310, the processor core 320, and/or the pipeline 340 in an extended pipeline mode. In the extended pipeline mode, the output signal from the pipeline stage in question is prevented from going to the next pipeline stage by using the error signal as a selection signal for a multiplexor switch circuit, such as the multiplexor switch circuit 380. The error handling circuitry 360 latches the error signal to maintain the extended pipeline mode. The PS E 370 can transmit the corrected output signal to the next stage via the multiplexor switch circuit 380, which can use the output of the error handling circuitry 360 as a selection signal. The use of the corrected output signal is now the de facto operational mode. In implementations, the error handling circuitry 360 can include circuitry to detect a pipeline bubble or idle cycles when the extended pipeline mode can be exited. In this instance, the error signal is cleared and the corrected data from the PS E 370 is not used. In the instance that the extended pipeline mode is entered, processing that was done on the presumably correct output signal, such as at the logic cloud 347, would need to be undone prior to the logic cloud 347 working on the corrected output signal.

Figure 5:
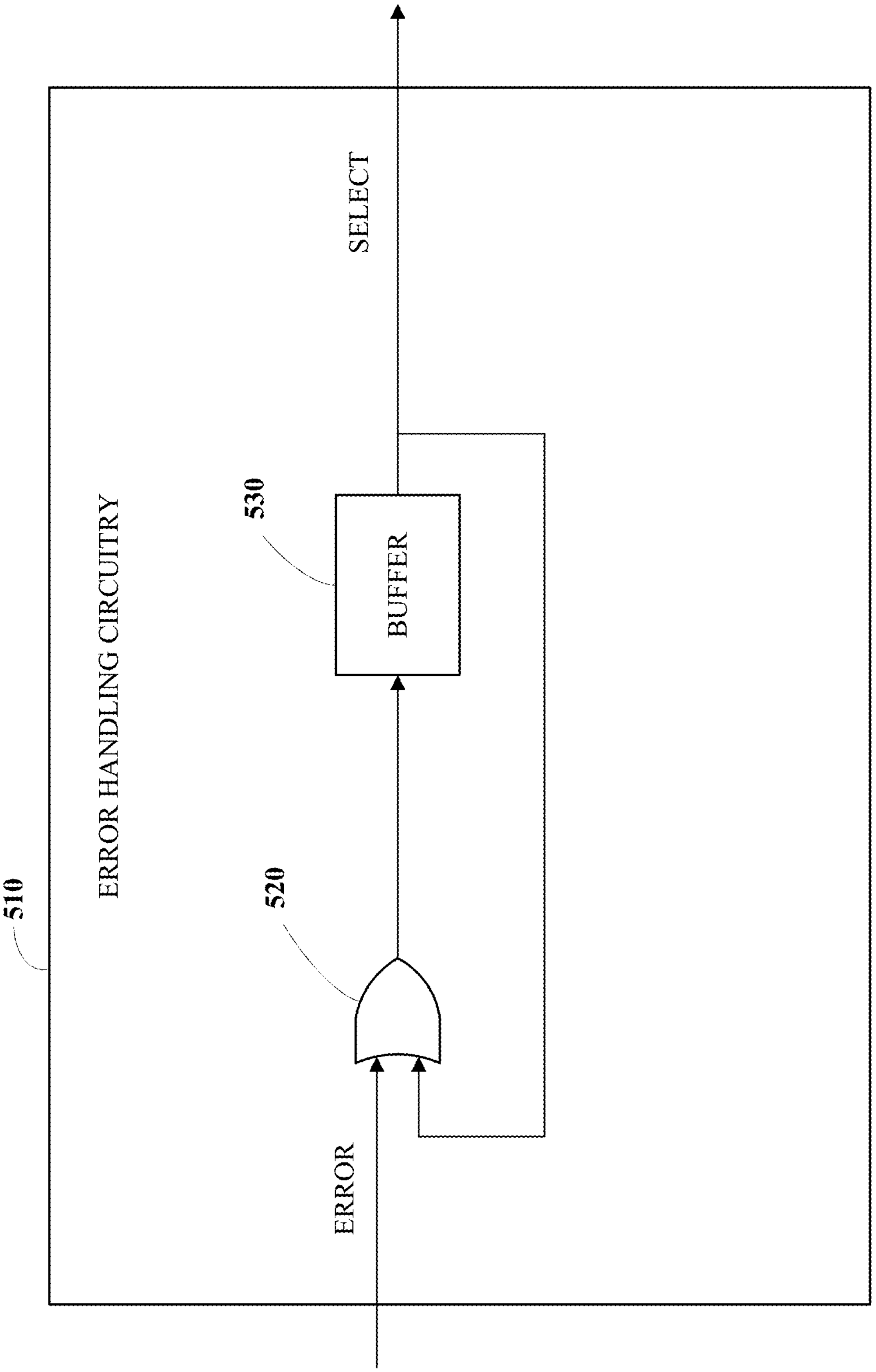
FIG. 5 is a block diagram of an example of an error handling circuitry configured to select, based on an error signal, whether a later pipeline stage receives an output signal from an earlier pipeline stage or a corrected output signal from an extended pipeline stage as input.

Referring now also to FIG. 5, a block diagram is shown of an example of an error handling circuitry 510 configured to select, based on the error signal, whether a later or next pipeline stage receives an output signal from an earlier pipeline stage or a corrected output signal from an extended pipeline stage as an input. The error handling circuitry 510 can include an OR logic gate 520, which has one input connected to an error signal from a data integrity check and correction circuitry. The OR logic gate 520 has an output connected to a buffer or register 530. The output of the buffer 530 is connected to another input of the OR logic gate 520.

The output of the buffer 530 is also a selection signal for a multiplexor switch circuit. Accordingly, once the extended pipeline mode is entered, regardless of whether there is an error signal, the extended pipeline mode is maintained continuously. That is, the buffer in a feedback loop is configured to maintain an error state after an occurrence of the error signal.

Figure 6:
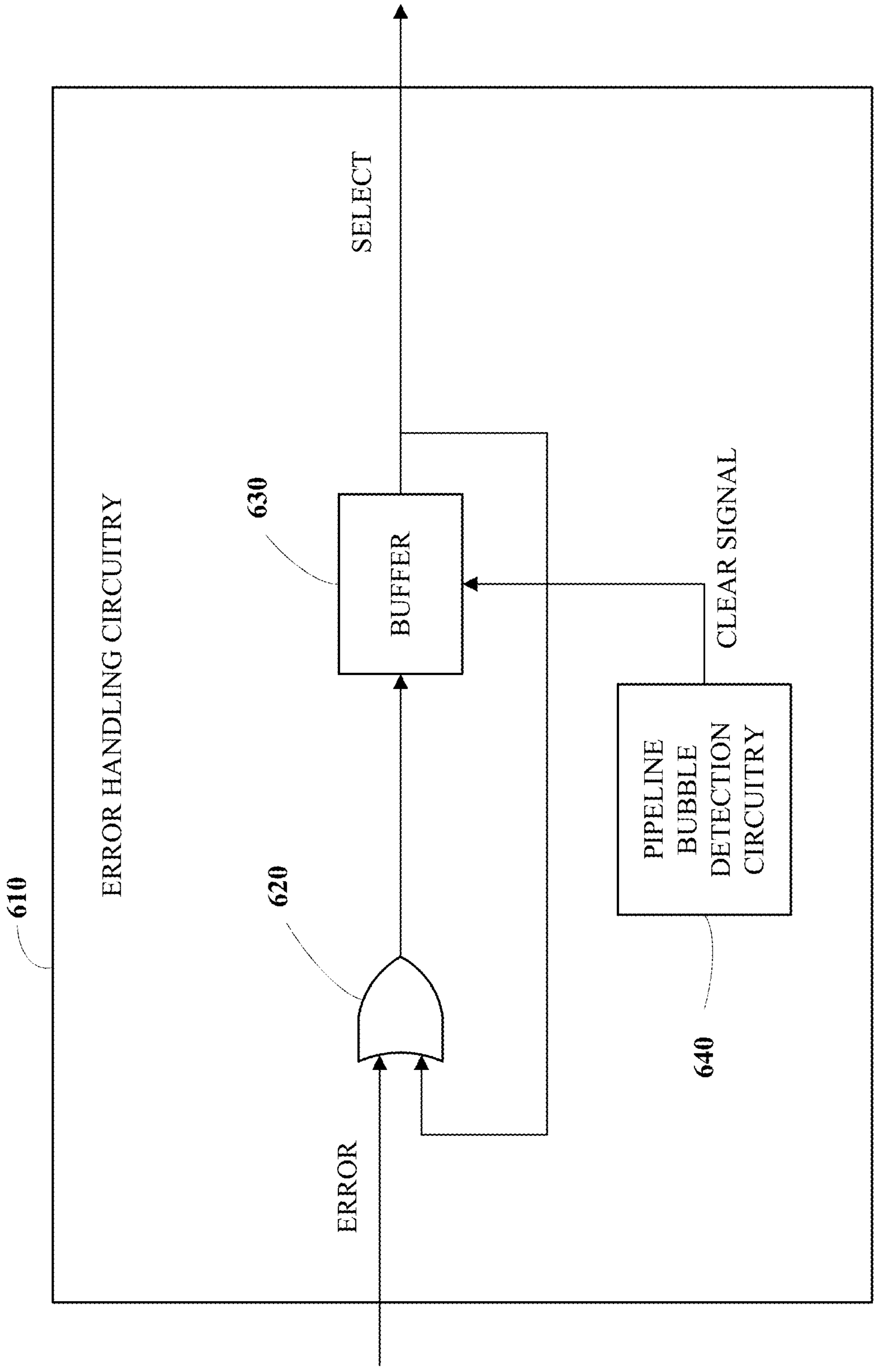
FIG. 6 is a block diagram of an example of an error handling circuitry configured to select, based on an error signal, whether a later pipeline stage receives an output signal from an earlier pipeline stage or a corrected output signal from an extended pipeline stage as input and revert back after detecting a pipeline bubble event.

Referring now also to FIG. 6, is shown a block diagram of an example of an error handling circuitry 610 configured to select, based on an error signal, whether a later or next pipeline stage receives an output signal from a pipeline stage or a corrected output signal from an extended pipeline stage as input and revert back after detecting a pipeline bubble event. The error handling circuitry 610 can include an OR logic gate 620, which has one input connected to an error signal from a data integrity check and correction circuitry. The OR logic gate 620 has an output connected to a buffer 630. The output of the buffer 630 is connected to another input of the OR logic gate 620. The output of the buffer 630 is also a selection signal for a multiplexor switch circuit. A pipeline bubble detection circuitry 640 is connected to the buffer 630. The pipeline bubble detection circuitry 640 can detect for idle cycles. Once idle cycles are detected, the pipeline bubble detection circuitry 640 can send a clear signal to reset the buffer 630. Accordingly, the extended pipeline mode is exited and the later or next pipeline stage receives an output signal from the pipeline stage.

Operationally, with reference to FIGS. 3 and 5-6, signals are processed and output signals are output at or by the pipeline stages PS 1 342, PS 2 344, PS 3 346, and a PS 4 348 of the pipeline 340 as implemented in the processor core 320 of the integrated circuit 310. Each of the pipeline stages PS 1 342, PS 2 344, PS 3 346, and a PS 4 348 sends or outputs presumably correct output data or signals to the next pipeline stage. A data integrity check and correction circuitry or error correction circuit, such as the data integrity check and correction circuitry 350, checks the validity or integrity of the presumably correct output signal. In the instance that a problem or issue is detected, the data integrity check and correction circuitry sends an error signal to an error handling circuitry, such as the error handling circuitry 360. This enables the extended pipeline mode. The data integrity check and correction circuitry also generates a corrected output signal in lieu of the presumably correct output signal, which is sent to or captured by an extended pipeline stage, such as the PS E 370.

The error signal acts as a selection signal for the multiplexor, such as the multiplexor 380, such that the corrected output signal is passed through to the next logic cloud and the next pipeline stage instead of the presumably correct output signal. The next logic cloud and next pipeline stage, such as the logic cloud 347 and the PS 4 348, processes the corrected output signal as appropriate and applicable. The extended pipeline mode is maintained by operation of the error handling circuitry.

In implementations, the error handling circuitry includes pipeline bubble detection circuitry, such as the pipeline bubble detection circuitry 640, to detect idle cycle(s). Upon detection of the idle cycle(s), the pipeline bubble detection circuitry 640 can reset the error handling circuitry or clear a buffer in the error handling circuitry such that the extended pipeline mode is exited. At this instance, data transmission is reverted such as to exclude the extended pipeline stage, e.g., the PS E 370. Collectively, for example, the corrected data or output signal from the extended pipeline stage is the input for next logic cloud and pipeline stage during a sequence of consecutive clock cycles between an occurrence of the error signal and an occurrence of a pipeline bubble event.

Figure 4:
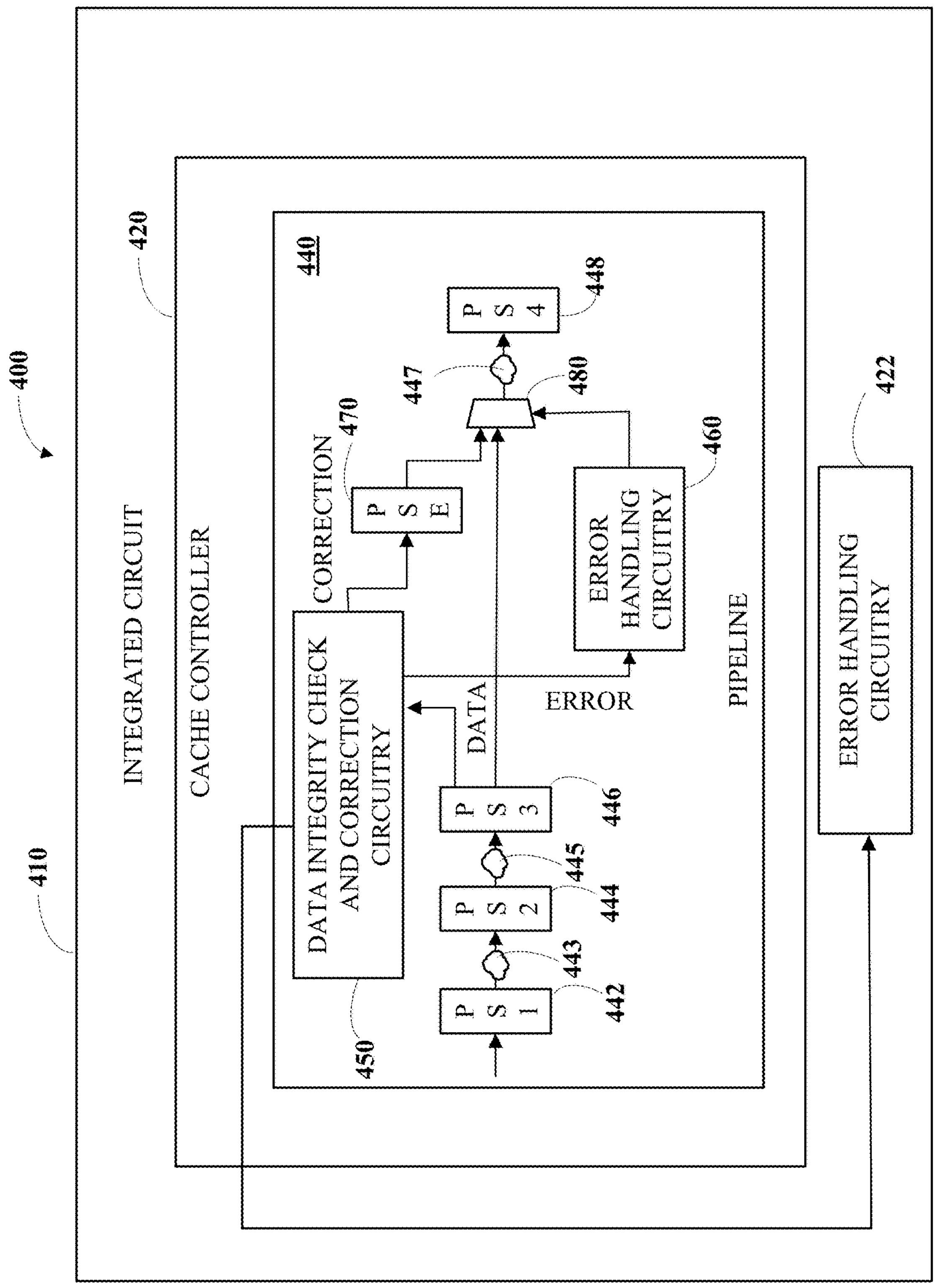
FIG. 4 is a block diagram of an example of an integrated circuit for variable depth pipelines for error correction. This example is employed in a cache controller.

FIG. 4 is a block diagram of an example of a system 400 including an integrated circuit 410 that implements variable depth pipelines for error correction when executing instructions, data, addresses, and the like (input signal). The integrated circuit 310 can include one or more systems, circuits, and/or components which can implement a variable depth pipeline for error correction. In some implementations, the integrated circuit 410 includes at least one cache controller 420. The cache controller 420 includes circuitry for executing an input signal and can include one or more pipelines, such as a pipeline 440. The cache controller 420 processes input signals in the one or more pipelines.

Each of the one or more pipelines, such as the pipeline 440, can include multiple pipeline stages and logic clouds (where a cloud may represent circuitry) which can process the input signal. For example, the pipeline 440 can include a pipeline stage (PS) 1 442, a logic cloud 443, a PS 2 444, a logic cloud 445, a PS 3 446, a logic cloud 447, and a PS 4 448. The number of pipeline stages and logic clouds are illustrative and the pipeline 440 can have any number of appropriate and applicable pipeline stages and logic clouds.

The pipeline 440 and/or the PS 1 442, the logic cloud 443, the PS 2 444, the logic cloud 445, the PS 3 446, the logic cloud 447, and the PS 4 448 can include a data integrity check and correction circuitry 450, an error handling circuitry 460, and an optionally-enabled PS extension or intermediate PS (collective PS E) 470. Multiple pipeline stages can be connected via a multiplexor switch circuit 480. The data integrity check and correction circuitry 450, the error handling circuitry 460, the PS E 470, and the multiplexor switch circuit 480 are shown, for purposes of illustration, with respect to PS 3 446 and PS 4 448. Implementation of the data integrity check and correction circuitry 450, the error handling circuitry 460, the PS E 470, and the multiplexor switch circuit 480 for the pipeline 440 and/or the PS 1 442, the logic cloud 443, the PS 2 444, the logic cloud 445, the PS 3 446, the logic cloud 447, and the PS 4 448 can vary without departing from the scope of the specification or claims.

The data integrity check and correction circuitry 450, the error handling circuitry 460, the PS E 470, the error handling circuitry 422, and the multiplexor switch circuit 480 can be implemented, function, and operate as described with respect to FIGS. 3 and 5-6.

Figure 7:
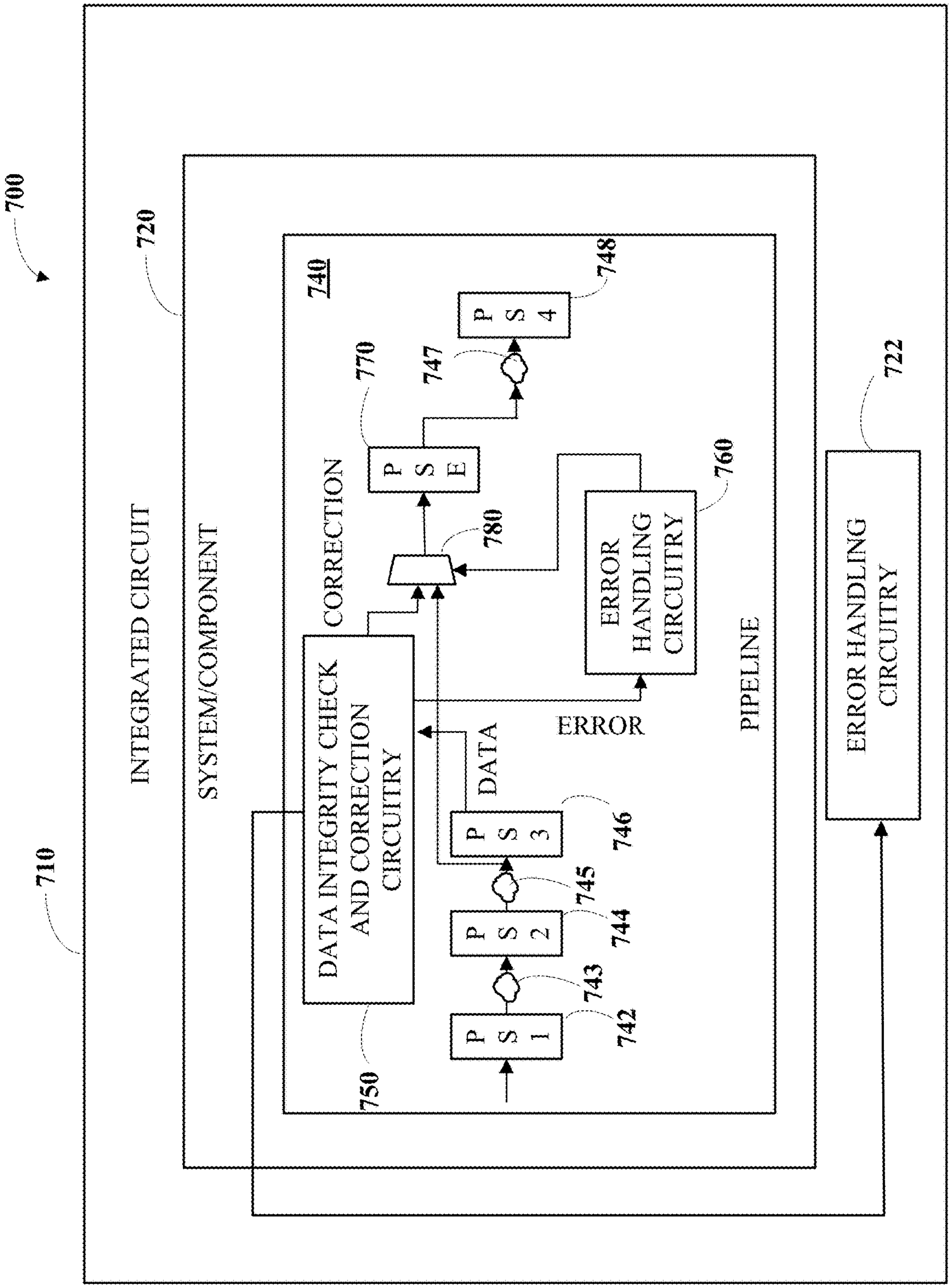
FIG. 7 is a block diagram of an example of an integrated circuit for variable depth pipelines for error correction. This example is employed in a pipeline of a system and/or component.

FIG. 7 is a block diagram of an example of a system 700 including an integrated circuit 710 that implements variable depth pipelines for error correction when processing or executing instructions, data, addresses, and the like (input signal). The integrated circuit 710 can include one or more systems, circuits, and/or components 720. The one or more systems, circuits, and/or components 720 can execute or process, for example, instructions, addresses, and/or data (collectively "input signals") and can include one or more pipelines, such as pipeline 740. For instance, the one or more systems, circuits, and/or components 720 can be a processor core, a cache controller, and the like. The system 700, the integrated circuit 710, and/or the one or more systems, circuits, and/or components 720 can implement a re-timed circuit version of the implementations described with respect to FIGS. 3-6 except as noted herein with respect to FIG. 8.

Each of the one or more pipelines, such as the pipeline 740, can include multiple pipeline stages and logic clouds (where a cloud may represent circuitry) which can process the input signal. For example, the pipeline 740 can include a pipeline stage (PS) 1 742, a logic cloud 743, a PS 2 744, a logic cloud 745, a PS 3 746, a logic cloud 747, and a PS 4 748. The number of pipeline stages and logic clouds are illustrative and the pipeline 740 can have any number of appropriate and applicable pipeline stages and logic clouds.

The pipeline 740 and/or the PS 1 742, the logic cloud 743, the PS 2 744, the logic cloud 745, the PS 3 746, the logic cloud 747, and the PS 4 748 can include a data integrity check and correction circuitry 750, an error handling circuitry 760, and a PS extension or intermediate PS (collective PS E) 770. Multiple pipeline stages can be connected via a multiplexor switch circuit 780. The data integrity check and correction circuitry 750, the error handling circuitry 760, the PS E 770, and the multiplexor switch circuit 780 are shown, for purposes of illustration, with respect to the PS 2 744, the PS 3 746 and the PS 4 748. Implementation of the data integrity check and correction circuitry 750, the error handling circuitry 760, the PS E 770, and the multiplexor switch circuit 780 for the pipeline 740 and/or the the PS 1 742, the logic cloud 743, the PS 2 744, the logic cloud 745, the PS 3 746, the logic cloud 747, and the PS 4 748 can vary without departing from the scope of the specification or claims.

The data integrity check and correction circuitry 750 can check for a problem, issue, or error (collectively "error") with respect to a presumably correct output signal that is exiting the pipeline 740 and/or at a pipeline stage(s). The data integrity check and correction circuitry 750 can verify value, data type, value range, and/or other criteria. In the instance that there is no error in the presumably correct output signal, a presumably correct input signal to the same pipeline stage is processed as is through the pipeline 740. The data integrity check and correction circuitry 750 can generate, issue, or transmit ("generate") an error signal when an issue or problem is detected with the output signal to the error handling circuitry 760 and can generate and transmit a correction or corrected output signal to the PS E 770. In the instance that the error in the presumably correct output signal cannot be corrected, the presumably correct input signal is processed as is through the pipeline 740 and an error report signal is sent to an external circuit such as error handling circuitry 722 for other error handling processing.

Detection of an error and subsequent actions, places the integrated circuit 710, the one or more systems, circuits, and/or components 720, and/or the pipeline 740 in an extended pipeline mode. In the extended pipeline mode, the output signal from the pipeline stage in question is prevented from going to the next pipeline stage by using the error signal as a selection signal for a multiplexor switch circuit, such as the multiplexor switch circuit 780. The error handling circuitry 760 latches the error signal to maintain the extended pipeline mode. The PS E 770 can transmit the corrected output signal to the next stage via the multiplexor switch circuit 780, which can use the output of the error handling circuitry 760 as a selection signal. The use of the corrected output signal is now the de facto operational mode. In implementations, the error handling circuitry 760 can include circuitry to detect a pipeline bubble or idle cycles when the extended pipeline mode can be exited. In this instance, the error signal is cleared and the corrected data from the PS E 770 is not used. In the instance that the extended pipeline mode is entered, processing that was done on the presumably correct input signal, such as at the logic cloud 747, would need to be undone prior to the logic cloud 747 working on the corrected output signal.

Figure 8:
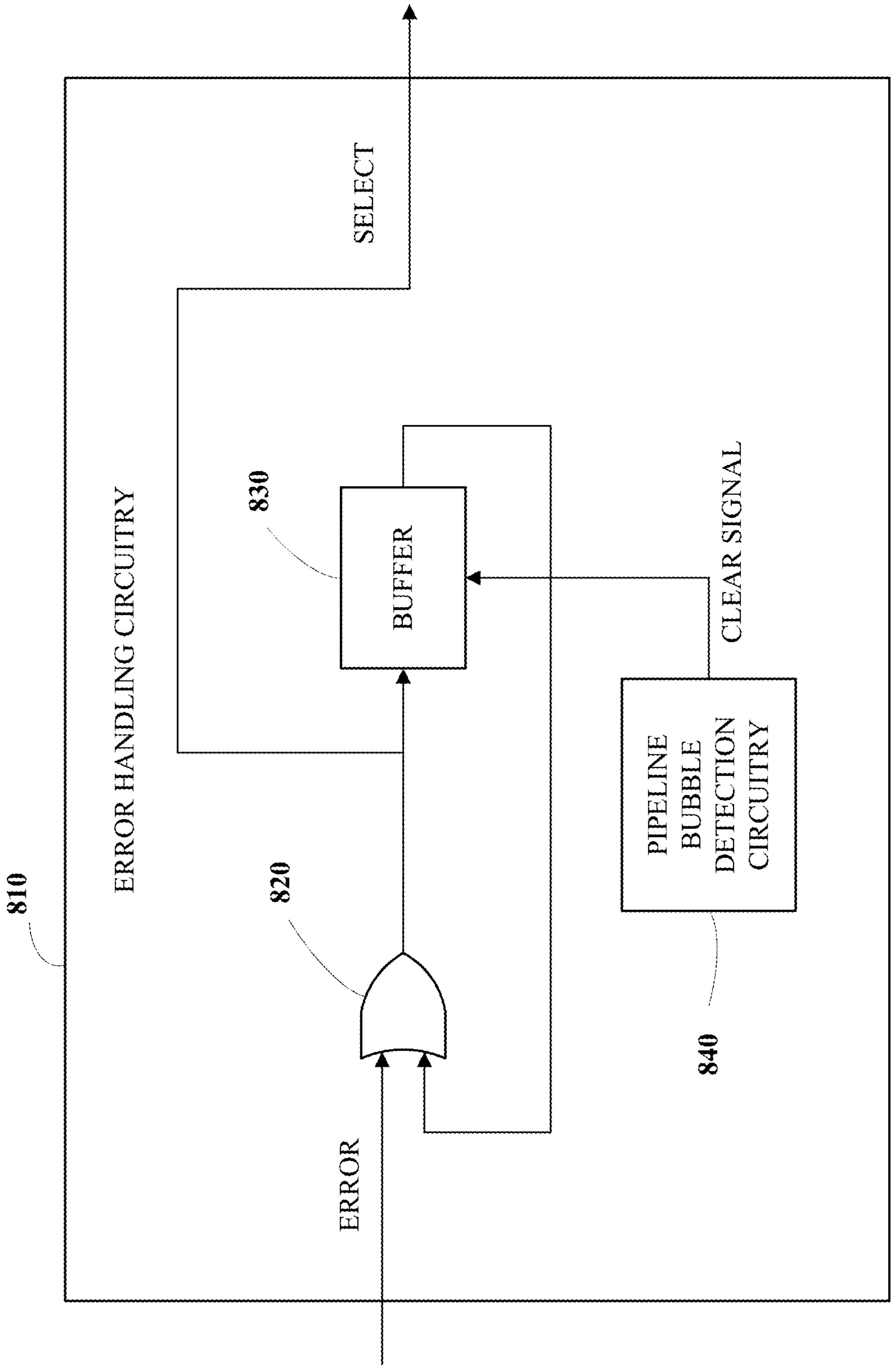
FIG. 8 is a block diagram of an example of an error handling circuitry configured to select, based on an error signal, whether a later pipeline stage receives an output signal from an earlier pipeline stage or a corrected output signal from an extended pipeline stage as input and revert back after detecting a pipeline bubble event. This is employed with the integrated circuit of FIG. 7.

Referring now also to FIG. 8, is shown a block diagram of an example of an error handling circuitry 810 ((which can be the an error handling circuitry 760) configured to select, based on an error signal, whether a later or next pipeline stage receives a signal from an earlier pipeline stage or a corrected output signal from an extended pipeline stage as input and revert back after detecting a pipeline bubble event. The error handling circuitry 810 can include an OR logic gate 820, which has one input connected to an error signal from a data integrity check and correction circuitry. The OR logic gate 820 has an output connected to a buffer 830. The output of the buffer 830 is connected to another input of the OR logic gate 820. A signal taken or tapped from between the OR gate 820 and the buffer 830 is a selection signal for a multiplexor switch circuit. A pipeline bubble detection circuitry 840 is connected to the buffer 830. The pipeline bubble detection circuitry 840 can detect for idle cycles. Once idle cycles are detected, the pipeline bubble detection circuitry 840 can send a clear signal to reset the buffer 830. Accordingly, the later or next pipeline stage receives a signal from the earlier pipeline stage.

Operationally, with respect to FIGS. 7 and 8, signals are input to and output signals are output at or by the pipeline stages PS 1 742, PS 2 744, PS 3 746, and a PS 4 748 of the pipeline 740 as implemented in the one or more systems, circuits, and/or components 720 of the integrated circuit 710. Each of the pipeline stages PS 1 742, PS 2 744, PS 3 746, and a PS 4 748 receives presumably correct input data or signals and outputs presumably correct output data or signals to the next pipeline stage. A data integrity check and correction circuitry or error correction circuit, such as the data integrity check and correction circuitry 750, checks the validity or integrity of the presumably correct output signal. In the instance that a problem or issue is detected, the data integrity check and correction circuitry sends an error signal to an error handling circuitry, such as the error handling circuitry 760. This enables the extended pipeline mode. The data integrity check and correction circuitry also generates a corrected output signal in lieu of the presumably correct output signal, which is sent to or captured by an extended pipeline stage, such as the PS E 770.

The error signal acts as a selection signal for the multiplexor, such as the multiplexor 780, such that the corrected output signal is passed through to the next logic cloud and the next pipeline stage instead of the presumably correct input signal. The next logic cloud and next pipeline stage, such as the logic cloud 747 and the PS 4 748, processes the corrected output signal as appropriate and applicable. The extended pipeline mode is maintained by operation of the error handling circuitry.

In implementations, the error handling circuitry includes pipeline bubble detection circuitry, such as the pipeline bubble detection circuitry 640, to detect idle cycle(s). Upon detection of the idle cycle(s), the pipeline bubble detection circuitry 640 can reset the error handling circuitry or clear a buffer in the error handling circuitry such that the extended pipeline mode is exited. Collectively, for example, the corrected output signal from the extended pipeline stage is the input for next logic cloud and pipeline stage during a sequence of consecutive clock cycles between an occurrence of the error signal and an occurrence of a pipeline bubble event.

Figure 9:
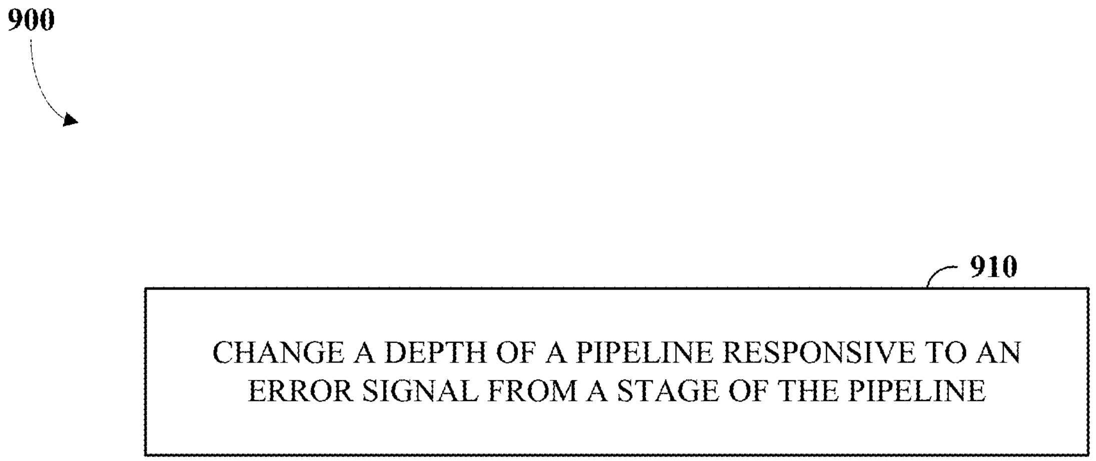
FIG. 9 is a flow chart of an example of a process using variable depth pipelines for error correction.

FIG. 9 is a flow chart of an example of a process 900 using variable depth pipelines for error correction. The process 900 can be executed and/or implemented by using the system 300, the system 400, the error handling circuitry 510, the error handling circuitry 610, the system 700, the error handling circuitry 810, and/or the components therein. The process 900 includes changing 910 a depth of a pipeline in response to an error signal from a stage of the pipeline. In some implementations, a depth of the pipeline can be variably selected between a pipeline operating in a standard mode where data passes from one pipeline stage to a next pipeline stage when the data has no issues and the pipeline operating in an extension mode where data passes from one pipeline stage to an intermediary pipeline stage and then to the next pipeline stage when the data has an issue. Extension mode circuitry can detect an issue in the data, generate corrected data, send the corrected data to the intermediary pipeline stage, issue an error signal, selectively enable the corrected data to be sent from the intermediary pipeline stage to the next pipeline stage using the error signal, and maintain operation in the extension mode using the error signal. In implementations, the extension mode circuitry can detect a pipeline bubble in the pipeline, clear the error signal, exit the extended pipeline mode, and revert back to the standard mode. In some implementations, a depth of the pipeline can be variably selected between using a presumably correct input signal at a pipeline stage or a corrected output signal based on a presumably correct output signal at the pipeline stage.

Figure 10:
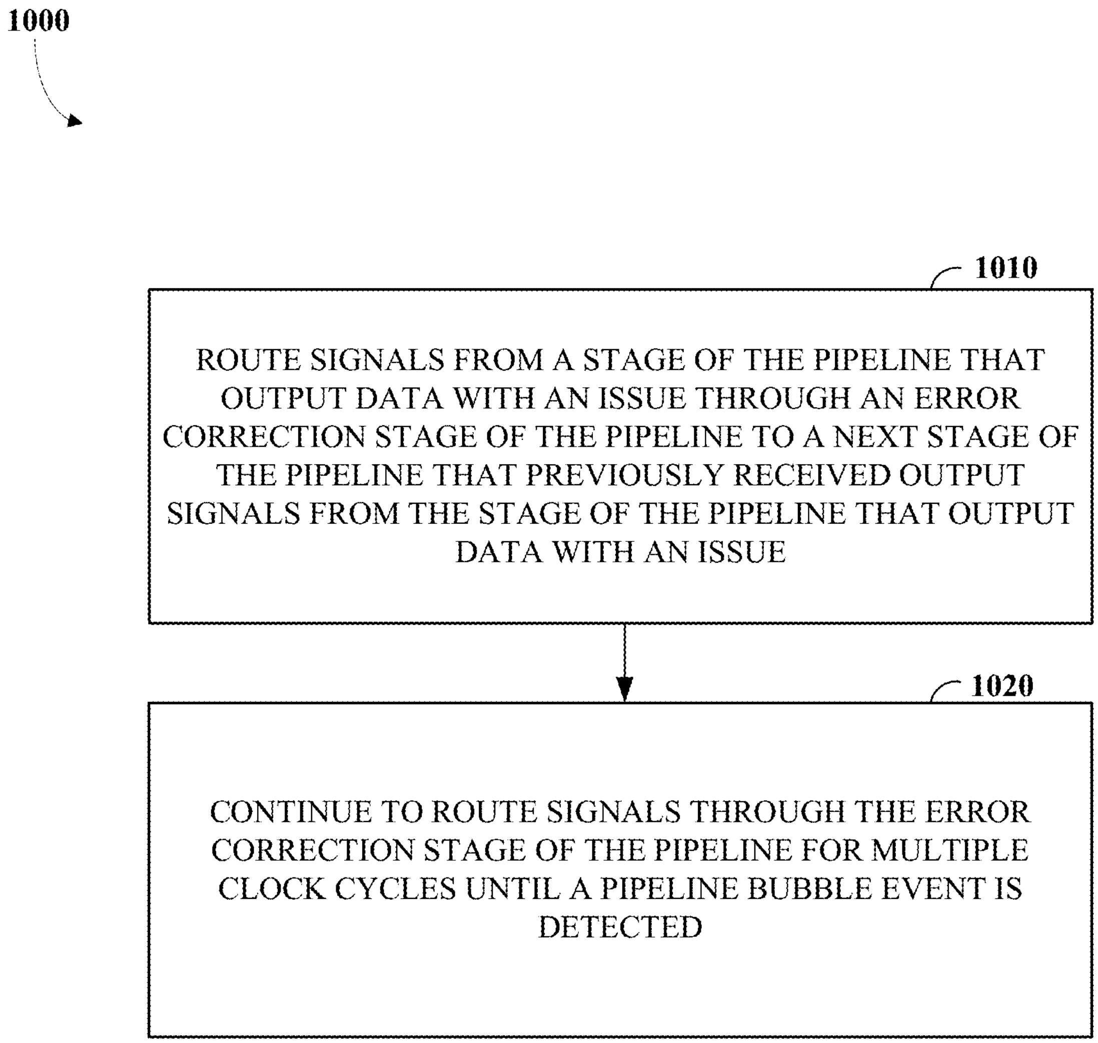
FIG. 10 is a flow chart of an example of a process using dynamically changing the depth of pipeline responsive to an error signal from a stage of the pipeline.

FIG. 10 is a flow chart of an example of a process 1000 dynamically changing the depth of a pipeline in response to an error signal due to a pipeline stage of a pipeline. The process 1000 can be executed and/or implemented by using the system 300, the system 400, the error handling circuitry 510, the error handling circuitry 610, the system 700, the error handling circuitry 810, and/or the components therein.

The process 1000 includes routing 1010 signals from a stage of the pipeline that output data with an issue through an error correction stage of the pipeline to a next stage of the pipeline that previously received output signals from the stage of the pipeline that output data with an issue, and continuing 1020 to route signals through the error correction stage of the pipeline for multiple clock cycles until a pipeline bubble event is detected.

The process 1000 includes routing 1010 signals from a stage of the pipeline that output data with an issue through an error correction stage of the pipeline to a next stage of the pipeline that previously received output signals from the stage of the pipeline that output data with an issue. The error correction stage can detect whether data being output by a stage has a problem. Detection of an error results in the issuance of an error signal and generation of corrected data that is sent to an extension stage. The error signal is used to selectively route the corrected data from the extension stage to the next stage.

The process 1000 includes continuing 1020 to route signals through the error correction stage of the pipeline for multiple clock cycles until a pipeline bubble event is detected. The error signal is also used to maintain passing the corrected data to the next stage once an error has been detected and the extension stage is being used. The error signal is cleared if idle cycles are detected. In this instance, the data is passed again between the stages as opposed to going through the extra stage, i.e., the extension stage.

Figure 11:
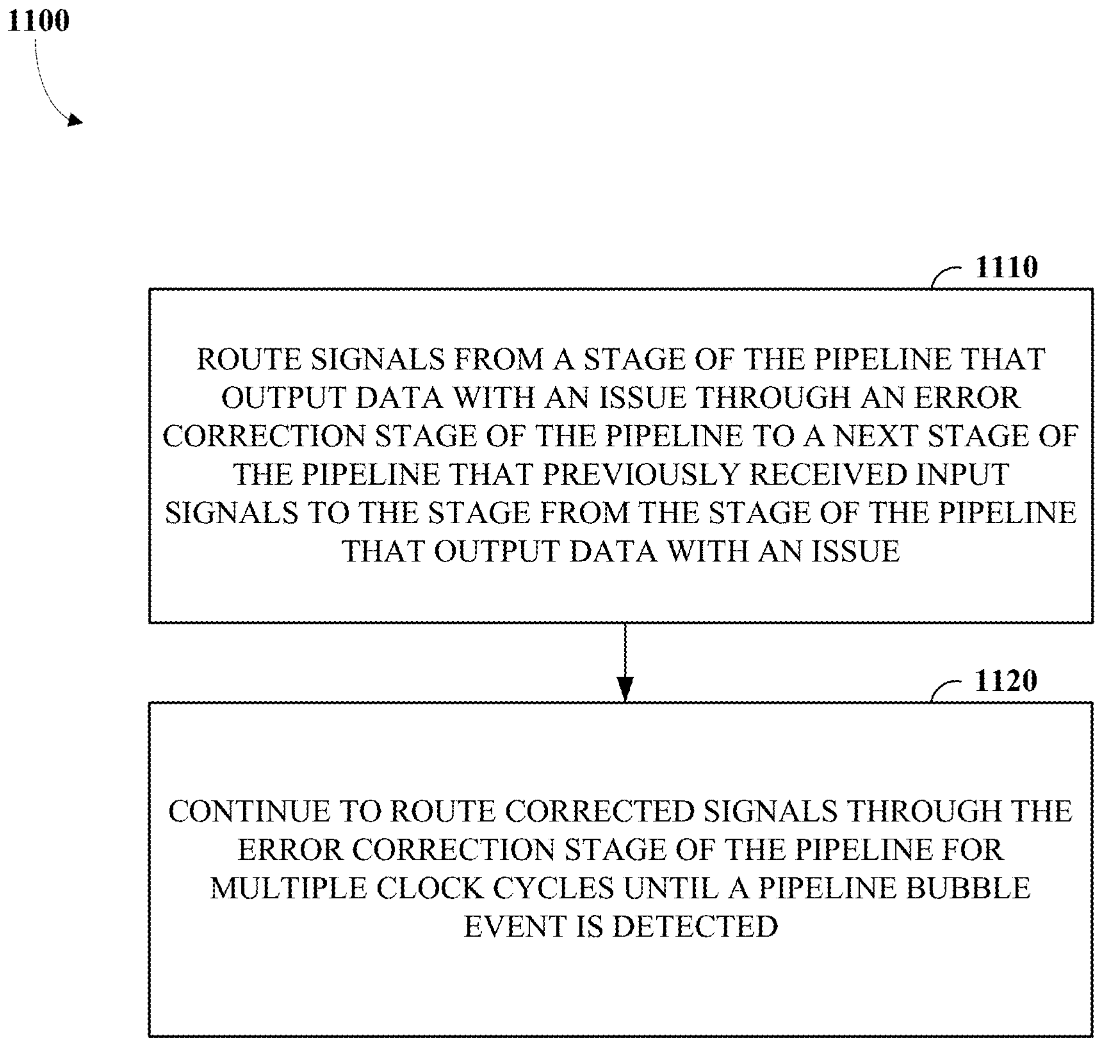
FIG. 11 is a flow chart of an example of a process using dynamically changing the depth of pipeline responsive to an error signal from a stage of the pipeline.

FIG. 11 is a flow chart of an example of a process 1100 dynamically changing the depth of a pipeline in response to an error signal due to a pipeline stage of a pipeline. The process 1100 can be executed and/or implemented by using the system 300, the system 400, the error handling circuitry 510, the error handling circuitry 610, the system 700, the error handling circuitry 810, and/or the components therein.

The process 1100 includes routing 1110 signals from a stage of the pipeline that output data with an issue through an error correction stage of the pipeline to a next stage of the pipeline that previously received input signals to the stage from the stage of the pipeline that output data with an issue, and continuing 1120 to route corrected signals through the error correction stage of the pipeline for multiple clock cycles until a pipeline bubble event is detected.

The process 1100 includes routing 1110 signals from a stage of the pipeline that output data with an issue through an error correction stage of the pipeline to a next stage of the pipeline that previously received input signals to the stage from the stage of the pipeline that output data with an issue. The error correction stage can detect whether data being output by a stage has a problem. Detection of an error results in the issuance of an error signal and generation of corrected data that is sent to an extension stage. The error signal is used to selectively route the corrected data from the extension stage to the next stage.

The process 1100 includes continuing 1120 to route corrected signals through the error correction stage of the pipeline for multiple clock cycles until a pipeline bubble event is detected. The error signal is also used to maintain passing the corrected data to the next stage once an error has been detected. The error signal is cleared if idle cycles are detected. In this instance, the data, which is the input data to the stage, is passed to the next stage without going through the stage itself. That is, there no extra stage in the pipeline.

In some implementations, an integrated circuit includes a first pipeline stage configured to generate an output signal, an error correction circuitry configured to generate an error signal based on a problem detected in the output signal, an extended pipeline stage configured to capture corrected output signal, a second pipeline stage configured to process a signal from the first pipeline stage or the corrected output signal from extended pipeline stage, and an error handling circuitry configured to select, based on the error signal, whether the second pipeline stage receives the signal from the first pipeline stage or the corrected output signal from the extended pipeline stage as input.

In some implementations, the error handling circuitry is configured to select the corrected output signal from the extended pipeline stage as the input for the second pipeline stage during a sequence of consecutive clock cycles between an occurrence of the error signal and an occurrence of a pipeline bubble event. In some implementations, the error handling circuitry includes a buffer in a feedback loop configured to maintain an error state after an occurrence of the error signal. In some implementations, the error handling circuitry includes a pipeline bubble detection circuitry configured to detect a pipeline bubble event and clear the buffer responsive to detecting the pipeline bubble event. In some implementations, the first pipeline stage, the extended pipeline stage, and the second pipeline stage are components of a pipeline in a cache controller. In some implementations, the first pipeline stage, the extended pipeline stage, and the second pipeline stage are components of a pipeline in a processor core. In some implementations, the corrected output signal is generated by the error correction circuitry.

In some implementations, a method includes changing a depth of a pipeline responsive to an error signal from a stage of the pipeline.

In some implementations, the changing the depth of the pipeline includes routing signals from the stage of the pipeline that resulted in the error signal to an error correction stage of the pipeline to a next stage of the pipeline that previously received output signals from the stage of the pipeline that resulted in the error signal. In some implementations, the method further includes continuing to route signals through the error correction stage of the pipeline for multiple clock cycles until a pipeline bubble event is detected. In some implementations, the method further includes continuing to route signals through the error correction stage of the pipeline for multiple clock cycles until at least one idle cycle is detected. In some implementations, the method further includes reverting back to routing signals in an absence of using the error correction stage once the at least one idle cycle is detected. In some implementations, the changing the depth of the pipeline further includes generating the error signal when detecting an error in data, generating corrected data for routing through the error correction stage, and using the error signal to selectively route the corrected data from the error correction stage to the next stage of the pipeline. In some implementations, the continuing to route signals includes using the error signal to maintain selectively routing from the error correction stage to the next stage of the pipeline. In some implementations, the method further includes clearing the error signal when the at least one idle cycle is detected to revert back to routing signals in the absence of using the error correction stage.

In some implementations, a non-transitory computer readable medium comprising a circuit representation that, when processed by a computer, is used to program or manufacture an integrated circuit including a first pipeline stage configured to generate an output signal, an error correction circuitry configured to generate an error signal based on a problem detected in the output signal, an extended pipeline stage configured to capture a corrected output signal, a second pipeline stage configured to process signals from the first pipeline stage or the corrected output signal from the extended pipeline stage, and an error handling circuitry configured to select, based on the error signal, whether the second pipeline stage receives the signal from the first pipeline stage or the corrected output signal from the extended pipeline stage as input.

In some implementations, the error handling circuitry is configured to select the corrected output signal from the extended pipeline stage as the input for the second pipeline stage during a sequence of consecutive clock cycles between an occurrence of the error signal and an occurrence of a pipeline bubble event. In some implementations, the error handling circuitry includes a buffer in a feedback loop configured to maintain an error state after an occurrence of the error signal, and a pipeline bubble detection circuitry configured to detect a pipeline bubble event and clear the buffer responsive to detecting the pipeline bubble event. In some implementations, the first pipeline stage, the extended pipeline stage, and the second pipeline stage are components of a pipeline in a processor core. In some implementations, the corrected output signal is generated by the error correction circuitry.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An integrated circuit comprising:

a first pipeline stage configured to generate an output signal;

an error correction circuitry configured to generate an error signal based on a problem detected in the output signal;

an extended pipeline stage configured to capture corrected output signal;

a second pipeline stage that is separate from the first pipeline stage and the extended pipeline stage and that is configured to process a signal from the first pipeline stage or the corrected output signal from extended pipeline stage; and an error handling circuitry configured to:

select, based on the error signal, whether the second pipeline stage receives the signal from the first pipeline stage or the corrected output signal from the extended pipeline stage as input; and maintain selection of the corrected output signal from the extended pipeline stage until a pipeline bubble event is detected.

2. The integrated circuit of claim 1, in which the error handling circuitry comprises:

a buffer in a feedback loop configured to maintain an error state after an occurrence of the error signal.

3. The integrated circuit of claim 2, in which the error handling circuitry comprises:

a pipeline bubble detection circuitry configured to detect a pipeline bubble event and clear the buffer responsive to detecting the pipeline bubble event.

4. The integrated circuit of claim 1, in which the first pipeline stage, the extended pipeline stage, and the second pipeline stage are components of a pipeline in a cache controller.

5. The integrated circuit of claim 1, in which the first pipeline stage, the extended pipeline stage, and the second pipeline stage are components of a pipeline in a processor core.

6. The integrated circuit of claim 1, in which the corrected output signal is generated by the error correction circuitry.

7. A method, comprising:

generating an output signal from a first pipeline stage;

generating an error signal using an error correction circuitry based on a problem detected in the output signal;

capturing a corrected output signal at an extended pipeline stage;

changing a depth of a pipeline by selecting, using an error handling circuitry based on the error signal, whether a second pipeline stage receives the signal from the first pipeline stage or the corrected output signal from the extended pipeline stage as input, maintaining selection of the corrected output signal from the extended pipeline stage until a pipeline bubble event is detected.

8. The method of claim 7, wherein changing the depth of the pipeline comprises:

routing signals from the stage of the pipeline that resulted in the error signal to an error correction stage of the pipeline to a second pipeline stage that previously received output signals from the first pipeline stage that resulted in the error signal.

9. The method of claim 8, wherein comprising:

continuing to route signals through the error correction stage of the pipeline for multiple clock cycles until at least one idle cycle is detected.

10. The method of claim 9, comprising:

reverting back to routing signals in an absence of using the error correction stage once the at least one idle cycle is detected.

11. The method of claim 10, wherein changing the depth of the pipeline comprises:

generating the error signal when detecting an error in data;

generating corrected data for routing through the error correction stage; and using the error signal to selectively route the corrected data from the error correction stage to the second pipeline stage.

12. The method of claim 9, wherein continuing to route signals comprises:

using the error signal to maintain selectively routing from the error correction stage to the second pipeline stage.

13. The method of claim 12, comprising:

clearing the error signal when the at least one idle cycle is detected to revert back to routing signals in the absence of using the error correction stage.

14. A non-transitory computer readable medium comprising a circuit representation that, when processed by a computer, is used to program or manufacture an integrated circuit comprising:

a first pipeline stage configured to generate an output signal;

an error correction circuitry configured to generate an error signal based on a problem detected in the output signal;

an extended pipeline stage configured to capture a corrected output signal;

a second pipeline stage that is separate from the first pipeline stage and the extended pipeline stage and that is configured to process signals from the first pipeline stage or the corrected output signal from the extended pipeline stage; and an error handling circuitry configured to:

select, based on the error signal, whether the second pipeline stage receives the signal from the first pipeline stage or the corrected output signal from the extended pipeline stage as input; and maintain selection of the corrected output signal from the extended pipeline stage until a pipeline bubble event is detected.

15. The non-transitory computer readable medium of claim 14, in which the error handling circuitry comprises:

a buffer in a feedback loop configured to maintain an error state after an occurrence of the error signal; and a pipeline bubble detection circuitry configured to detect a pipeline bubble event and clear the buffer responsive to detecting the pipeline bubble event.

16. The non-transitory computer readable medium of claim 14, in which the first pipeline stage, the extended pipeline stage, and the second pipeline stage are components of a pipeline in a processor core.

17. The non-transitory computer readable medium of claim 14, in which the corrected output signal is generated by the error correction circuitry.

* * * * *